US012218517B2

(12) United States Patent
Saeki et al.

(10) Patent No.: US 12,218,517 B2
(45) Date of Patent: Feb. 4, 2025

(54) WIRELESS POWER TRANSMISSION SYSTEM AND RESONANCE FREQUENCY ADJUSTMENT UNIT FOR WIRELESS POWER TRANSMISSION SYSTEM

(71) Applicants: Murata Manufacturing Co., Ltd., Kyoto (JP); NATIONAL UNIVERSITY CORPORATION TOYOHASHI UNIVERSITY OF TECHNOLOGY, Aichi (JP)

(72) Inventors: Hiromasa Saeki, Nagaokakyo (JP); Masaya Tamura, Toyohashi (JP); Suzuka Akai, Toyohashi (JP)

(73) Assignees: Murata Manufacturing Co., Ltd., Kyoto (JP); NATIONAL UNIVERSITY CORPORATION TOYOHASHI UNIVERSITY OF TECHNOLOGY, Aichi (JP)

( * ) Notice: Subject to any disclaimer, the term of this patent is extended or adjusted under 35 U.S.C. 154(b) by 0 days.

(21) Appl. No.: 18/363,412

(22) Filed: Aug. 1, 2023

(65) Prior Publication Data

US 2023/0378814 A1 Nov. 23, 2023

Related U.S. Application Data

(63) Continuation of application No. PCT/JP2021/042458, filed on Nov. 18, 2021.

(30) Foreign Application Priority Data

Feb. 2, 2021 (JP) ................................ 2021-015045

(51) Int. Cl.

| | |
|---|---|
| ***H02J 50/12*** | (2016.01) |
| ***H02J 50/00*** | (2016.01) |
| ***H02J 50/90*** | (2016.01) |

(52) U.S. Cl.
CPC ............ *H02J 50/12* (2016.02); *H02J 50/005* (2020.01); *H02J 50/90* (2016.02)

(58) Field of Classification Search
CPC ........... H02J 50/005; H02J 50/12; H02J 50/90
(Continued)

(56) References Cited

U.S. PATENT DOCUMENTS

| | | | | |
|---|---|---|---|---|
| 10,707,685 B2 * | 7/2020 | Sample | .................. | H02J 50/20 |
| 10,819,151 B2 * | 10/2020 | Sample | .................. | H02J 50/90 |

(Continued)

FOREIGN PATENT DOCUMENTS

| | | |
|---|---|---|
| JP | 2017-188985 A | 10/2017 |
| JP | 2019-041529 A | 3/2019 |

OTHER PUBLICATIONS

Sushia Rahimizadeh et al.; "Scalable adaptive wireless powering of multiple electronic devices in an over-moded cavity"; Conference Paper: Wireless Power Transfer (WPT); 2013 IEEE; pp. 84-87.

(Continued)

*Primary Examiner* — Hal Kaplan
(74) *Attorney, Agent, or Firm* — Studebaker & Brackett PC

(57) ABSTRACT

A wireless power transmission system includes a structure entirely surrounded by an electromagnetic wave shielding member having appropriate electrical conductivity and appropriate frequency selectivity; at least one power receiving unit; at least one power transmission unit; and at least one resonance frequency adjuster. The resonance frequency adjuster includes at least one conductive protrusion having an open end and a transmission line connected to another end of the conductive protrusion at one end of the transmission line, wherein the open end of the conductive protrusion is arranged inside the structure, and the transmission line is electrically connected to the electromagnetic wave shielding (Continued)

1
2
5
Z
Y
X
3
4 member defining a wall surface of the structure at another end not connected to the conductive protrusion.

20 Claims, 12 Drawing Sheets

(58) Field of Classification Search
USPC .......................................................... 307/104
See application file for complete search history.

(56) References Cited

U.S. PATENT DOCUMENTS

2016/0164301 A1 6/2016 Sample et al.
2018/0097402 A1 4/2018 Sample et al.

OTHER PUBLICATIONS

Henry Mei et al.; "Cavity Resonator Wireless Power Transfer System for Freely Moving Animal Experiments"; IEEE Transactions on Biomedical Engineering; vol. 64, No. 4; Jun. 2016; pp. 775-785.
International Search Report issued in PCT/JP2021/042458; mailed Jan. 11, 2022.

* cited by examiner

WIRELESS POWER TRANSMISSION SYSTEM AND RESONANCE FREQUENCY ADJUSTMENT UNIT FOR WIRELESS POWER TRANSMISSION SYSTEM

CROSS-REFERENCE TO RELATED APPLICATIONS

This application claims benefit of priority to International Patent Application No. PCT/JP2021/042458, filed Nov. 18, 2021, and to Japanese Patent Application No. 2021-015045, filed Feb. 2, 2021, the entire contents of each are incorporated herein by reference.

BACKGROUND

Technical Field

The present disclosure relates to a wireless power transmission system and a resonance frequency adjuster for wireless power transmission systems. Specifically, the present disclosure relates to a wireless power transmission system including a power transmitter that transmits high frequency electromagnetic waves. The wireless power transmission system of the present disclosure uses a space surrounded by wall surfaces, such as an inside of a warehouse, an inside of a factory, or an inside of a vehicle. The present disclosure relates to a structure and an electronic device for supplying wireless power by introducing electromagnetic waves of a frequency set in advance, regardless of the size of the space surrounded by wall surfaces and an object inside the space.

Background Art

Along with a recent explosive increase of Internet of Things (IoT) devices, there have been problems arising with the method of supplying power to such devices. It is difficult to establish wire connection to a huge number of devices, and it is very laborious to replace exhausted batteries when the batteries are used as the power source. Technology to wirelessly transmit power has been expected to solve these problems.

S. Rahimizadeh, S. Korhummel, B. Kaslon, Z. Popovic, "Scalable adaptive wireless powering of multiple electronic devices in an over-moded cavity," Conference Paper: Wireless Power Transfer (WPT), 2013 IEEE (Non-Patent Literature 1) discloses a wireless power transmission system in which a space surrounded by metal is used to resemble a resonator. In this system, electromagnetic waves are emitted from a power transmission unit at a resonance frequency specific to the resonator so as to transmit power to a power receiver in the resonator. Non-Patent Literature 1 specifically discloses the relationship of resonance frequency versus resonator size and resonance mode.

H. Mei, K. A. Thanckston, R. A. Bercich, J. G. R. Jefferys, and P. P. Irazoqui, "Cavity Resonator Wireless Power Transfer System for Freely Moving Animal Experiments," IEEE Biomed. Eng., Vol. 64, No. 4, pp. 775-785, June 2016 (Non-Patent Literature 2) discloses a wireless power transmission system in which a space surrounded by metal is used to resemble a resonator. In this system, electromagnetic waves are emitted from a power transmission unit at a resonance frequency specific to the resonator so as to transmit power to a power receiver in the resonator. According to Non-Patent Literature 2, the resonance frequency changes depending on an object inside the resonator.

SUMMARY

In a conventional wireless power transmission system, a space surrounded by an electrical conductor is used to resemble a resonator. Such a system performs wireless power transmission, using electromagnetic waves set at a resonance frequency determined according to the resonator size and resonance mode. Thus, the wireless power transmission system uses different frequencies depending on the resonator size, so that a circuit of a power transmission unit needs to be re-designed each time for the desired resonance frequency.

For example, Non-Patent Literature 1 specifically discloses the relationship of resonance frequency versus resonator size and resonance mode. The disclosure shows that when the resonance mode, i.e., the electromagnetic field distribution in the resonator, is determined, the resonance frequency is uniquely determined for each resonator size. However, the size of the space used by the wireless power transmission system differs depending on the purpose and environment of use, so that the transmission frequency must be adjusted for each environment. Thus, the circuit of the power transmission unit requires a unique design for each environment of use, which is industrially undesirable.

In order to achieve a high power transfer efficiency, the frequency of electromagnetic waves to be transmitted from the power transmitter needs to be adjusted depending on the size, shape, number, and materials of an object(s) inside the resonator. This complicates the circuit configuration of the power transmission unit and may cause impedance mismatch at the power transmission unit.

For example, Non-Patent Literature 2 examines wireless power transmission through electromagnetic waves to a power receiver attached to a rat enclosed in a metal cavity resonator. The authors of Non-Patent Literature 2 reveal in the literature that while the resonance frequency specific to the resonator was 346.6 MHz in both measured and calculated results before the rat was enclosed, the resonance frequency changed to 335.0 MHz after the rat was enclosed. The change in resonance frequency is attributed to a difference in relative permittivity between substances that make up the body of the rat and air. In other words, the resonance frequency changes not only when a rat is placed but also when an object made of a material different from air is placed in the resonator.

In the assumed case of a system that wirelessly transmits power to ITO devices in an actual-use environment using a space such as a factory or warehouse to resemble a resonator, the IoT devices and other objects in the resonator are not always arranged in a constant pattern. In other words, the resonance frequency is expected to change from time to time. The frequency of electromagnetic waves to be transmitted from the power transmitter needs to match the resonance frequency of the resonator. Thus, in the use environment described above, a complicated circuit is required which transmits power while detecting the resonance frequency of the resonator as appropriate and adjusting the frequency of electromagnetic waves to a suitable frequency.

In addition, optimal conditions for impedance matching between the resonator and the power transmission unit change for each frequency. Thus, when the frequency used for power transmission changes, impedance mismatch occurs between the matching circuit and the resonator, reducing power transmission efficiency.

Accordingly, the present disclosure provides a wireless power transmission system that does not require changing the transmission frequency, regardless of the resonator size or regardless of the arrangement, number, and materials of an object(s) inside the resonator. Further, the present disclosure aims to provide a resonance frequency adjuster for the wireless power transmission system.

The wireless power transmission system of the present disclosure includes a structure entirely surrounded by an electromagnetic wave shielding member having appropriate electrical conductivity and appropriate frequency selectivity; at least one power receiving unit; at least one power transmission unit; and at least one resonance frequency adjuster. The resonance frequency adjuster includes at least one conductive protrusion having an open end; and a transmission line connected to another end of the conductive protrusion at one end of the transmission line. The open end of the conductive protrusion is arranged inside the structure, and the transmission line is electrically connected to the electromagnetic wave shielding member defining a wall surface of the structure at another end not connected to the conductive protrusion.

The resonance frequency adjuster for a wireless power transmission system of the present disclosure includes at least one conductive protrusion having an open end; and a transmission line connected to another end of the conductive protrusion at one end of the transmission line. The wireless power transmission system includes a structure entirely surrounded by an electromagnetic wave shielding member having appropriate electrical conductivity and appropriate frequency selectivity; at least one power receiving unit; and at least one power transmission unit. The open end of the conductive protrusion is to be arranged inside the structure, and the transmission line is to be electrically connected to the electromagnetic wave shielding member defining a wall surface of the structure at another end not connected to the conductive protrusion.

The present disclosure uses a resonance frequency adjuster including a conductive protrusion and a transmission line, whereby the present disclosure can perform wireless power transmission using a constant resonance frequency, regardless of the resonator size or regardless of an object inside the resonator.

DETAILED DESCRIPTION

Embodiments of the present disclosure are described below with reference to the drawings.

Herein, terms representing the relationship between elements (e.g., “vertical”, “parallel”, and “perpendicular”) and terms representing shapes of the elements are expressions that not only refer to exact meanings but also connote substantially equivalent ranges, e.g., a range with a difference of a few percentage points.

Figure 1:
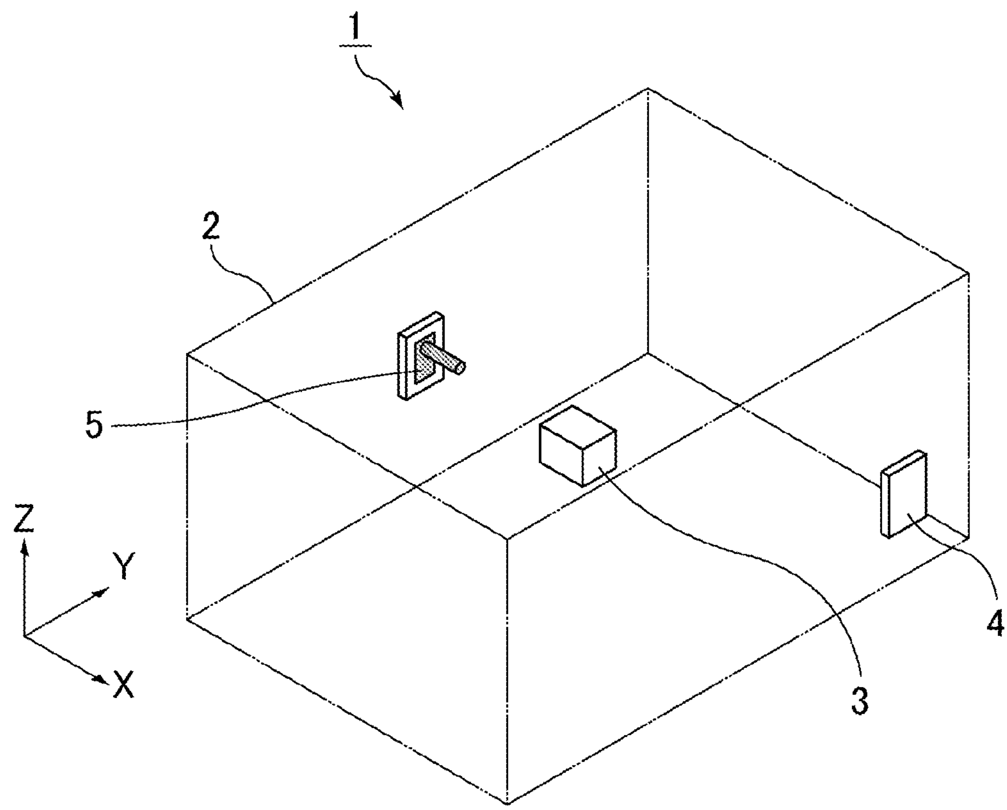
FIG. 1 shows a diagram of an example of a wireless power transmission system according to the present disclosure.

FIG. 1 shows a diagram of an example of the wireless power transmission system according to the present disclosure. In FIG. 1, a wireless power transmission system 1 uses a structure entirely surrounded by an electromagnetic wave shielding member 2 having appropriate electrical conductivity and appropriate frequency selectivity to resemble a resonator. The wireless power transmission system 1 includes at least one power receiving unit 3 and at least one power transmission unit 4 inside thereof, and also includes at least one resonance frequency adjuster 5 on the structure. In other words, the wireless power transmission system 1 refers to the entire assembly to achieve wireless power transmission. The shape of the structure is not limited to a cuboidal shape. For example, the shape may be a pentagonal prism shape having a pentagonal ZX plane, a quadrangular prism shape having a trapezoidal ZX plane, a semi-cylindrical shape having a semicircular ZX plane, or the like.

The electromagnetic wave shielding member 2 may be made of any electrical conductive material. Preferred examples include metal materials such as copper, aluminum, iron, stainless steel, and nickel. Preferred examples also include conductive oxide materials such as zinc oxide, titanium oxide, and indium tin oxide (ITO); graphite; and organic conductive materials. The electromagnetic wave shielding member 2 may have a multilayered structure made of these materials mentioned above. Alternatively, any conductive alloy or mixture may be used. In addition, the electromagnetic wave shielding member 2 may be in any shape such as a plate form, a mesh form, a film form, or a porous form as long as it works as an electromagnetic wave shielding member at a frequency at which power is supplied. It suffices as long as the electromagnetic wave shielding member 2 has an electromagnetic wave shielding function only relative to the frequency used for wireless power transmission. For example, the electromagnetic wave shielding member 2 may allow electromagnetic waves at the frequency for wireless communication to pass therethrough. In other words, it suffices as long as the electromagnetic wave shielding member 2 has appropriate frequency selectivity.

Figure 2A:
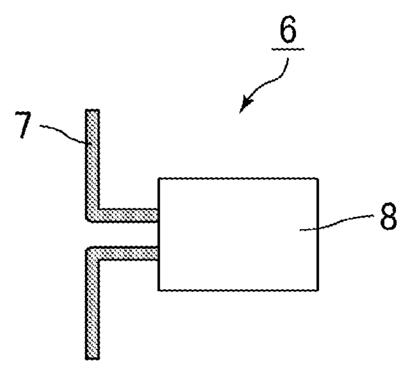
FIG. 2A shows a schematic view of an example of a power receiver in a power receiving unit according to the present disclosure.
Figure 2B:
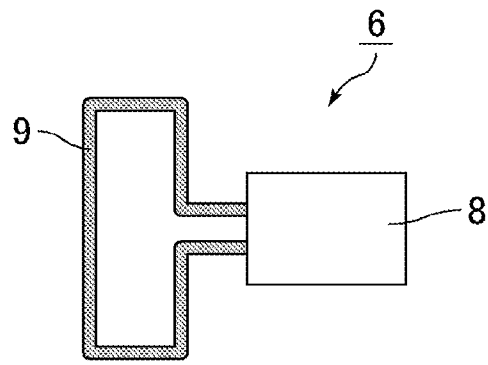
FIG. 2B shows a schematic view of another example of the power receiver in the power receiving unit according to the present disclosure.

The power receiving unit 3 includes a power receiver 6. The configuration of the power receiver 6 is described with reference to FIG. 2A and FIG. 2B. For example, the power receiver 6 includes an electrical wiring section 7 or 9 that serves as an antenna, and a rectifier circuit 8. A switch, a matching circuit, and the like may be attached to the power receiver 6 as needed. Typically, a dipole antenna 7, a loop antenna 9, or the like is suitable as the antenna. The dipole antenna 7 may be bent as appropriate. Alternatively, an inverted-F antenna may be employed in which the circuit is partially short-circuited at the ground or at a part that serves as a reference potential of the power receiving unit 3. The corresponding frequency can be adjusted by inserting a capacitor or an inductor into a portion of the antenna wiring. Such a capacitor or an inductor can be suitably selected according to the resonance frequency from the resonator defined by the electromagnetic wave shielding member 2.

Figure 3:
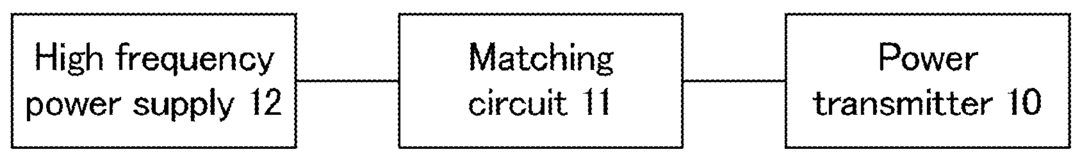
FIG. 3 shows the configuration of a power transmission unit according to the present disclosure.

The configuration of the power transmission unit 4 is described with reference to FIG. 3. The power transmission unit 4 includes a power transmitter 10, a matching circuit 11, and a high frequency power supply 12. The matching circuit 11 is connected between the power transmitter 10 and the high frequency power supply 12. The matching circuit 11 is adjusted to match the impedance between the power transmission unit 4 and the resonator at a pre-set transmission frequency.

The configuration of the power transmitter 10 is described with reference to FIG. 4. The power transmitter 10 includes, for example, a metal bar 13 and a transmission antenna wiring 14 arranged vertically to the metal bar 13. Preferably, the metal bar 13 is placed substantially vertically to the electromagnetic wave shielding member 2. Here, while the metal bar 13 is placed to avoid electrical connection with the electromagnetic wave shielding member 2, the metal bar 13 penetrates the electromagnetic wave shielding member 2 and is electrically connected to the matching circuit 11 placed outside of the resonator (i.e., the structure). When the reference potential of the matching circuit 11 and the high frequency power supply 12 is almost the same as the reference potential of the electromagnetic wave shielding member 2, a connector such as a Sub Miniature Type A (SMA) terminal may be used as appropriate for connection. When the reference potential of the matching circuit 11 and the high frequency power supply 12 is different from the reference potential of the electromagnetic wave shielding member 2, an equivalent effect can be obtained with the use of a dipole antenna (not shown) or a loop antenna (not shown) as in the case of the power receiver 6. The transmission antenna wiring 14 may be wired on a printed wiring board or the like, or the metal bar 13 may be bent and used as wiring. The transmission antenna wiring 14 may be bent as appropriate in a plane where the transmission antenna wiring 14 is wired. Preferably, the transmission antenna wiring 14 is substantially parallel to the wall surface of the resonator including the electromagnetic wave shielding member 2 when power is transmitted with the use of an electric field. Preferably, the transmission antenna wiring 14 is substantially vertical to the wall surface of the resonator including the electromagnetic wave shielding member 2 when power is transmitted with the use of a magnetic field.

The configuration of a resonance frequency adjuster 5 is described with reference to FIG. 5A, FIG. 5B, and FIG. 5C. The resonance frequency adjuster 5 includes a conductive protrusion 15 and a transmission line 16. The open end of the conductive protrusion 15 is arranged inside the resonator (i.e., the structure). Here, the term "protrusion" refers to the shape in which the open end sticks out from the electromagnetic wave shielding member 2 toward the inside of the resonator. The protrusion may have a rod, wire, umbrella, mushroom, conical, pyramidal, or loop shape, for example. Alternatively, a wiring on the printed wiring board or the like may be arranged to stick out as a substitute to the protrusion. The conductive protrusion 15 may be protected with a member such as resin for purposes such as protection of the shape of the protrusion or safety measures. The other end (closed end) of the conductive protrusion 15, which is not the open end, is connected to the transmission line 16. Preferably, the impedance of the transmission line 16 is adjusted to 50Ω by employing a strip line structure, for example. The other end of the transmission line 16, which is not connected to the conductive protrusion 15, is electrically connected to the electromagnetic wave shielding member 2.

The transmission line 16 may include an element 17 in the middle of its electrical path. The element 17 is an inductor or a capacitor. Examples include stubs, capacitors, inductors, varactor diodes, and micro-electro-mechanical systems (MEMS) elements. The resonance frequency can be adjusted according to the inductance value or the capacitance value of the element 17. Particularly preferred is an element capable of controlling the inductance value or the capacitance value by electronic signals input from the outside. In other words, preferably, the element 17 is a variable inductor or a variable capacitor.

Figure 5A:
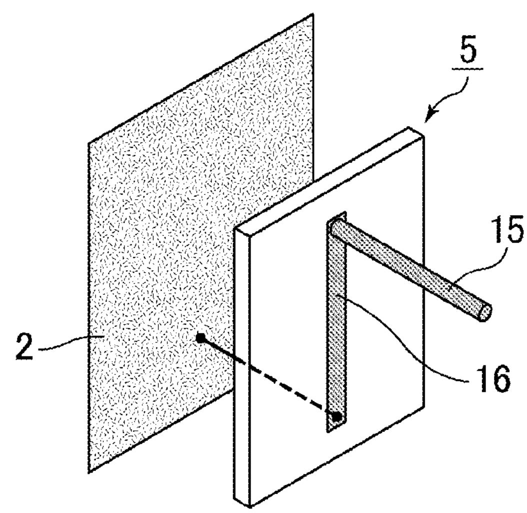
FIG. 5A shows a schematic view of an example of a resonance frequency adjuster according to the present disclosure.
Figure 5B:
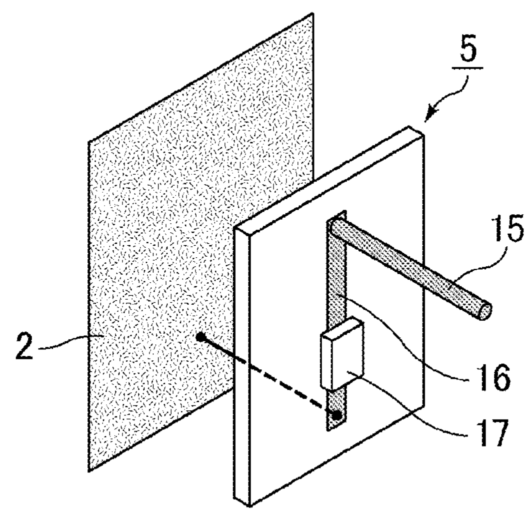
FIG. 5B shows a schematic view of another example of the resonance frequency adjuster according to the present disclosure.
Figure 5C:
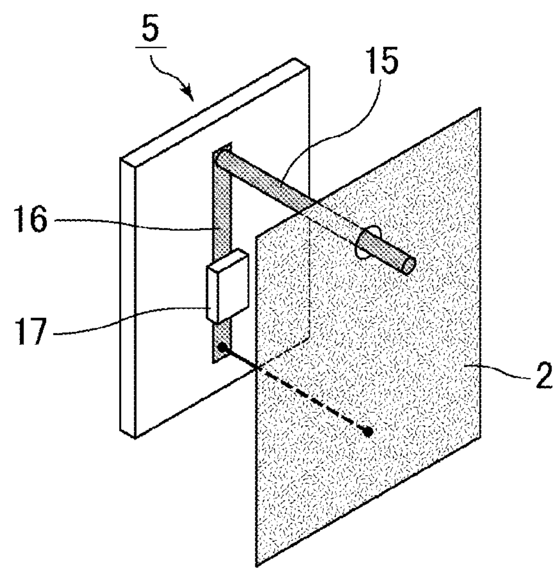
FIG. 5C shows a schematic view of yet another example of the resonance frequency adjuster according to the present disclosure.

While the sticking-out open end of the conductive protrusion 15 needs to be inside the resonator, other portions (other than the open end) of the conductive protrusion 15, the transmission line 16, and the element 17 (the element 17 is optional) may be placed inside the resonator as shown in FIG. 5A and FIG. 5B or may be placed outside the resonator as shown in FIG. 5C.

The resonance frequency adjuster 5 configured as described above is applicable to general wireless power transmission systems which use the resonance mode.

Here, a resonator not including the resonance frequency adjuster 5 is examined. The resonance frequency $f_r$ can be determined by the following formula 1 when the length of the resonator in the horizontal direction is represented by a (X-axis direction) and b (Y-axis direction), and the length of the resonator in the vertical direction is represented by c (Z-axis direction).

$$f_r = v/(2\pi\times(\mu_r\times\varepsilon_r)^{1/2})\times\{(m\pi/a)^2+(n\pi/b)^2+(p\pi/c)^2\}^{1/2} \quad \text{Formula 1}$$

In the formula, v represents the speed of light; $\mu_r$ represents the relative magnetic permeability; $\varepsilon_r$ represents the relative permittivity; and m, n, and p represent integers.

A case is considered where, for example, the resonance mode is a TE(011) mode in which m=0, n=1, and p=1, and the resonance frequency adjuster 5 is placed on a YZ plane of the resonator, the YZ plane being a plane perpendicular to an X-axis direction where the order of the resonance mode is zero. When the resonance frequency adjuster 5 is placed as described above, the electrical line length in the X-axis direction is a value obtained by adding the electrical length a' including the electrical lengths of the conductive protrusion 15, the transmission line 16, and the element 17 (the element 17 is optional) to the length a of the resonator by itself. Accordingly, the resonance frequency is shifted to a low frequency $f_r'$. Here, the $f_r'$ is expressed by the following formula 2.

$$f_r' = v/(2\pi\times(\mu_r\times\varepsilon_r)^{1/2})\times\{(m\pi/(a+a'))^2+(n\pi/b)^2+(p\pi/c)^2\}^{1/2} \quad \text{Formula 2}$$

The formula 2 shows that the resonance frequency $f_r'$ is constant at any resonator size a, as long as the value of a' is adjusted such that the value of a+a' is constant. In other words, the formula 2 shows that when the electrical lengths of the conductive protrusion 15, the transmission line 16, and the element 17 (the element 17 is optional) are made adjustable, a constant transmission frequency can be used regardless of the resonator size a.

When the average relative magnetic permeability and the average relative permittivity changed to $\mu_r'$ and $\varepsilon_r'$, respectively, due to placement of an object other than air inside the resonator, the resonance frequency is shifted to frequency $f_r''$. Here, $f_r''$ is expressed by the following formula 3.

$$f_r'' = v/(2\pi\times(\mu_r'\times\varepsilon_r')^{1/2})\times\{m\pi/(a+a')^2+(n\pi/b)^2+(p\pi/c)^2\}^{1/2} \quad \text{Formula 3}$$

The formula 3 shows that when the average relative magnetic permeability and the average relative permittivity changed to $\mu_r'$ and $\varepsilon_r'$, respectively, the resonance frequency $f_r''$ can be controlled to a constant value by adjusting the electrical length a' according to the changes. In other words, when the electrical lengths of the conductive protrusion 15, the transmission line 16, and the element 17 (the element 17 is optional) are made adjustable, wireless power transmission can be achieved using a constant transmission frequency even with an object other than air placed inside the resonator.

Regarding the arrangement of the resonance frequency adjuster 5, preferably, the open end of the conductive protrusion 15 is arranged at a position where the relative electric field strength is 0.2 or more and 1 or less (i.e., from 0.2 to 1), assuming that the maximum electric field strength in a space away from the power transmission unit 4 by λ/20 or more within the space surrounded by the electromagnetic wave shielding member 2 is defined as 1, where λ is the wavelength of electromagnetic waves emitted from the power transmission unit 4. More preferably, the open end of the conductive protrusion 15 is arranged at a position where the relative electric field strength is 0.33 or more and 1 or less (i.e., from 0.33 to 1). The effect of changing the resonance frequency is sufficiently obtained by arranging the open end of the conductive protrusion 15 at a position where the relative electric field strength inside the resonator is 0.2 or more. Even when the resonance frequency adjuster 5 is arranged at a position where the amount of change in resonance frequency is small, the amount of change in resonance frequency can be adjusted by the electrical length of the transmission line 16 or the element 17. Thus, the resonance frequency can be adjusted regardless of the arrangement of the resonance frequency adjuster 5.

Figure 6:
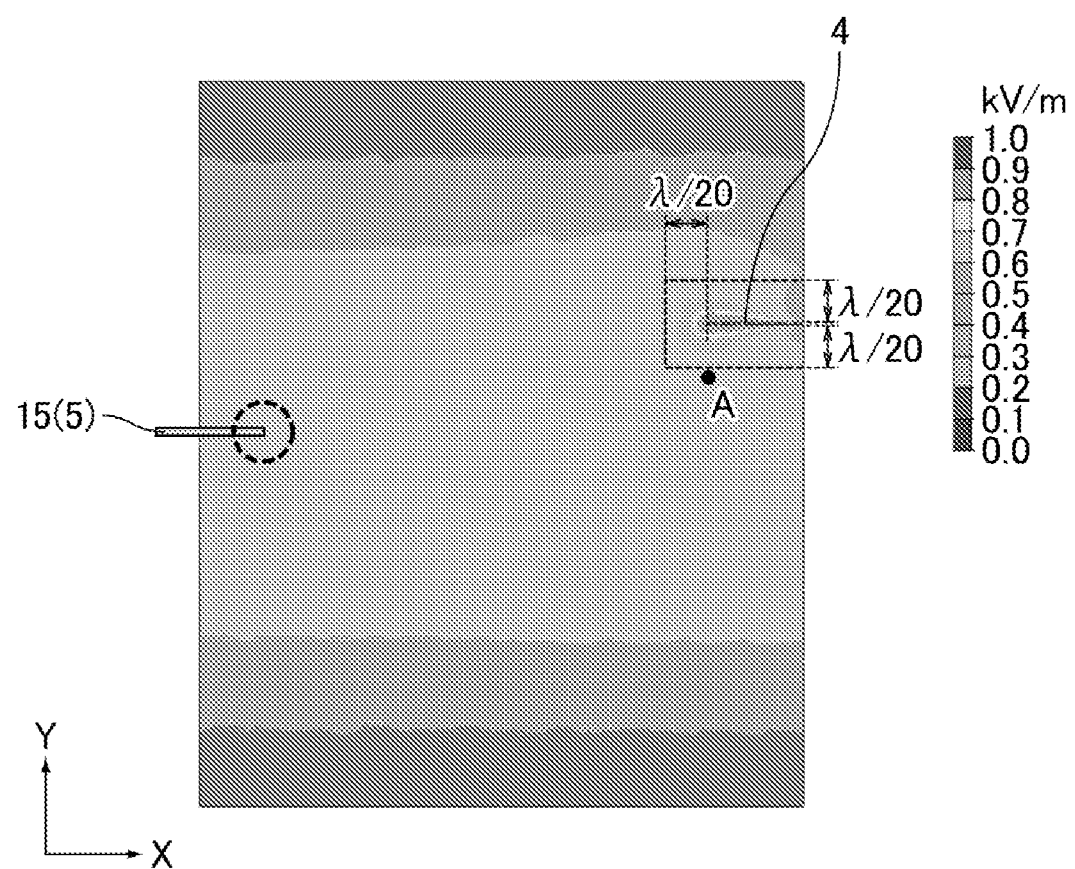
FIG. 6 shows an example of electric field strength distribution in a space surrounded by an electromagnetic wave shielding member.

FIG. 6 shows an example of electric field strength distribution in the space surrounded by the electromagnetic wave shielding member 2. FIG. 6 shows the electric field strength distribution in the resonator viewed from directly above (XY plane at the length c/2 in the Z-axis direction) before placing the resonance frequency adjuster 5. The positions away from the power transmission unit 4 (e.g., the metal bar 13 or the transmission antenna wiring 14) by λ/20 are indicated by dashed lines, and the magnitude of maximum electric field strength (indicated with a dot A in FIG. 6) on the dashed lines and in the space outside the dashed lines is defined as 1. In this case, the open end of the conductive protrusion 15 defining the resonance frequency adjuster 5 is arranged at a position where the relative electric field strength is 0.2 or more and 1 or less (i.e., from 0.2 to 1) (e.g., the position circled in FIG. 6). After the resonance frequency adjuster 5 is placed, the electric field strength around the resonance frequency adjuster 5 increases, so that the electric field strength distribution before placing the resonance frequency adjuster 5 is always used as the reference.

In particular, when a TE fundamental mode resonance is used, the function of the resonance frequency adjuster 5 is more effectively exhibited by placing the resonance frequency adjuster 5 on a wall surface of the resonator, the wall surface being perpendicular to an axis where the mode order is zero. Thus, preferably, the resonance frequency adjuster 5 is placed on a wall surface of the structure, the wall surface being perpendicular to an azimuth where an order of the resonance mode is zero when the resonance mode is a TE(0np) mode and n and p are integers.

The wireless power transmission system of the present disclosure is not limited to the embodiments described above, and various modifications and changes can be made within the scope of the present disclosure.

EXAMPLES

Examples that more specifically disclose the wireless power transmission system of the present disclosure are described below. The present disclosure is not limited to these examples.

Example 1

Figure 7:
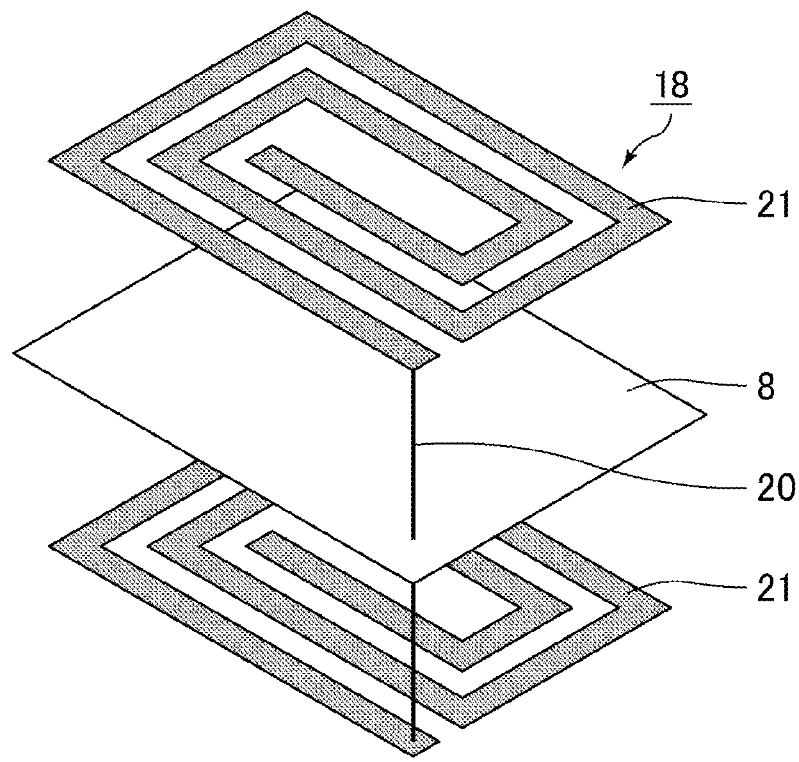
FIG. 7 shows a schematic view of a power receiver according to Example 1 of the present disclosure.
Figure 8:
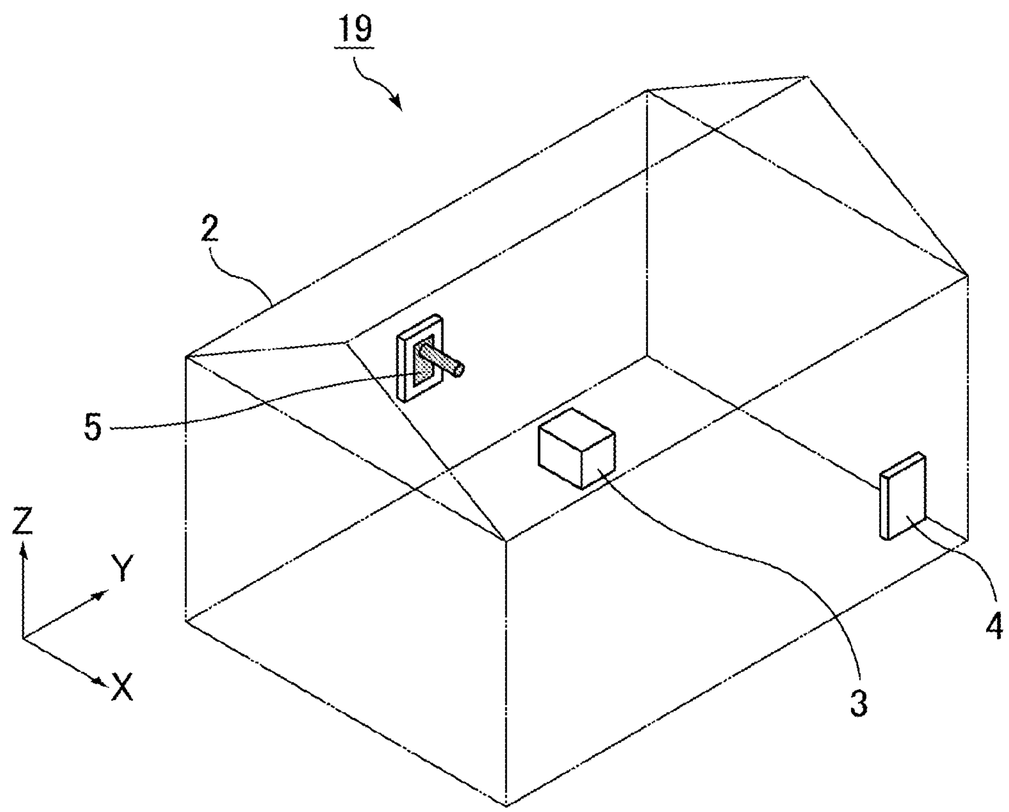
FIG. 8 shows a schematic view of a wireless power transmission system according to Example 1 of the present disclosure.

FIG. 7 shows a schematic view of a power receiver 18 according to Example 1 of the present disclosure. FIG. 8 shows a schematic view of a wireless power transmission system 19 according to Example 1 of the present disclosure.

Figure 4:
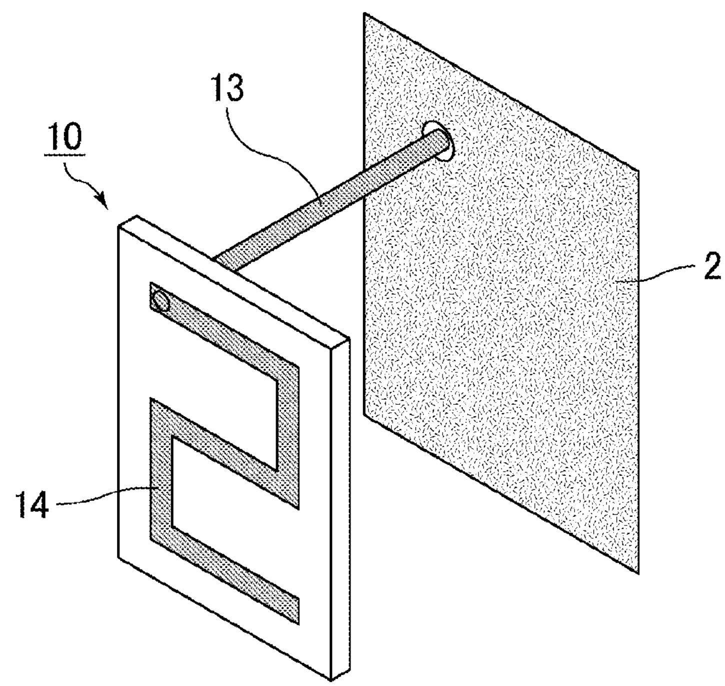
FIG. 4 shows a schematic view of an example of a power transmitter in the power transmission unit according to the present disclosure.

In Example 1, the wireless power transmission system 19 shown in FIG. 8 is examined which includes the power transmitter 10 shown in FIG. 4, the power receiver 18 shown in FIG. 7, and the electromagnetic wave shielding member 2 including an aluminum frame, a zinc mesh wall, and an aluminum floor.

The wireless power transmission system 19 has a shape with a gable roof. The length a in the X-axis direction is 1500 mm, and the length b in the Y-axis direction is 1800 mm. The height of a vertical wall portion is 1500 mm. The height including the gable roof is 1960 mm. the resonance frequency adjuster 5 is placed on a YZ plane. The power transmitter 10 of the power transmission unit 4 is placed on another YZ plane facing the resonance frequency adjuster 5. The power receiver 18 of the power receiving unit 3 is placed at the center in the XY plane at a height of 1000 mm from the floor.

The power receiver 18 includes printed circuit board wirings 21 and a metal wire 20 connecting between the rectifier circuit 8 and each printed circuit board wiring 21. The power receiver 18 includes two printed circuit board wirings 21. Here, the direction in which these two printed circuit board wirings 21 appear to overlap each other when projected is defined as the receiving antenna direction. A 10-kΩ load resistor was connected to the rectifier circuit of the power receiver 18 for evaluation.

The conductive protrusion 15 attached to the resonance frequency adjuster 5 was a Cu rod having a diameter of 1 mmΦ and a length of 600 mm. The transmission line 16 was a microstrip line (length L=30 mm) with an impedance of 50Ω. The element 17 was a trimmer capacitor. A trimmer capacitor whose capacitance value (also referred to as an "element value" or an "element parameter") was adjusted to 18 pF, and a trimmer capacitor whose capacitance value was adjusted to 27 pF were used.

In the wireless power transmission system 19, the power receiver 18 was placed such that the direction of the receiving antenna would coincide with the X-axis direction, and the frequency of electromagnetic waves emitted from the power transmitter 10 was adjusted such that the voltage generated across the load resistance would be maximized. Then, the resonance frequency was measured.

Figure 9:
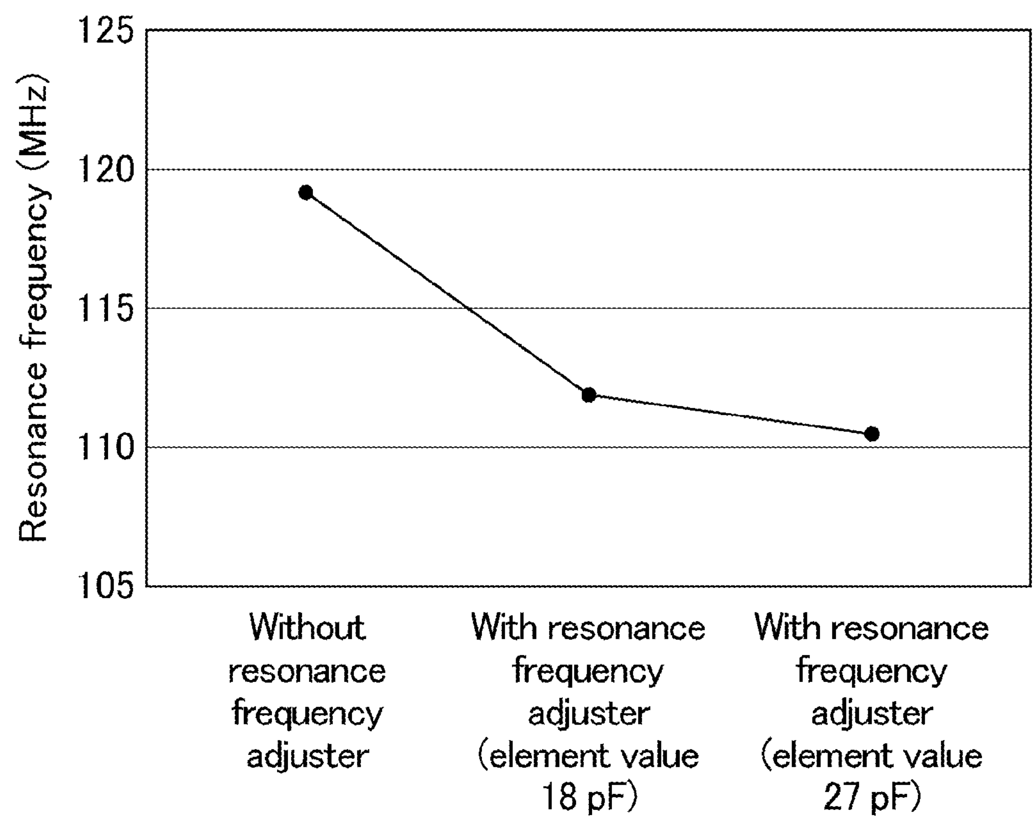
FIG. 9 shows a graph showing the change in resonance frequency according to the setting of the resonance frequency adjuster according to Example 1 of the present disclosure.

FIG. 9 shows the measurement results of the resonance frequency obtained in the following cases: the resonance frequency adjuster 5 was not attached; the resonance frequency adjuster 5 was attached, and the element value of the element 17 was set to 18 pF; and the resonance frequency adjuster 5 was attached, and the element value of the element 17 was set to 27 pF. FIG. 9 shows that the resonance frequency was shifted to a low frequency by attaching the resonance frequency adjuster 5 and that the resonance frequency can be controlled by adjusting the capacitance value of the element 17.

As described above, the resonance frequency can be freely controlled by adjusting the electrical length of the resonance frequency adjuster 5 placed on the wall surface of the resonator. This makes it possible to provide a system capable of wirelessly transmitting power at a constant frequency, regardless of the resonator size or an object inside the resonator.

Example 2

Figure 10:
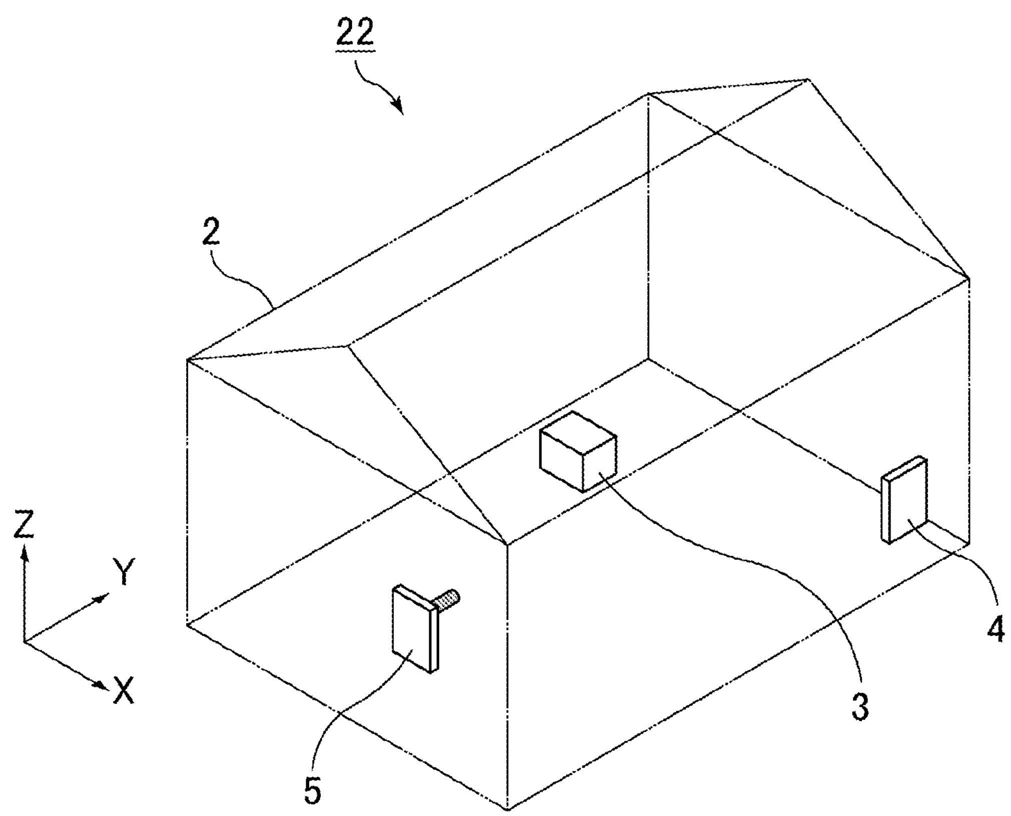
FIG. 10 shows a schematic view of a wireless power transmission system according to Example 2 of the present disclosure.

FIG. 10 shows a schematic view of a wireless power transmission system 22 according to Example 2 of the present disclosure.

In Example 2, the wireless power transmission system 22 shown in FIG. 10 is examined which includes the power transmitter 10 shown in FIG. 4, the power receiver 18 shown in FIG. 7, and the electromagnetic wave shielding member 2 including an aluminum frame, a zinc mesh wall, and an aluminum floor. In the wireless power transmission system 19 of Example 1, the resonance frequency adjuster 5 is placed on the YZ plane. In the wireless power transmission system 22 of Example 2, the resonance frequency adjuster 5 is placed on the ZX plane.

Figure 11:
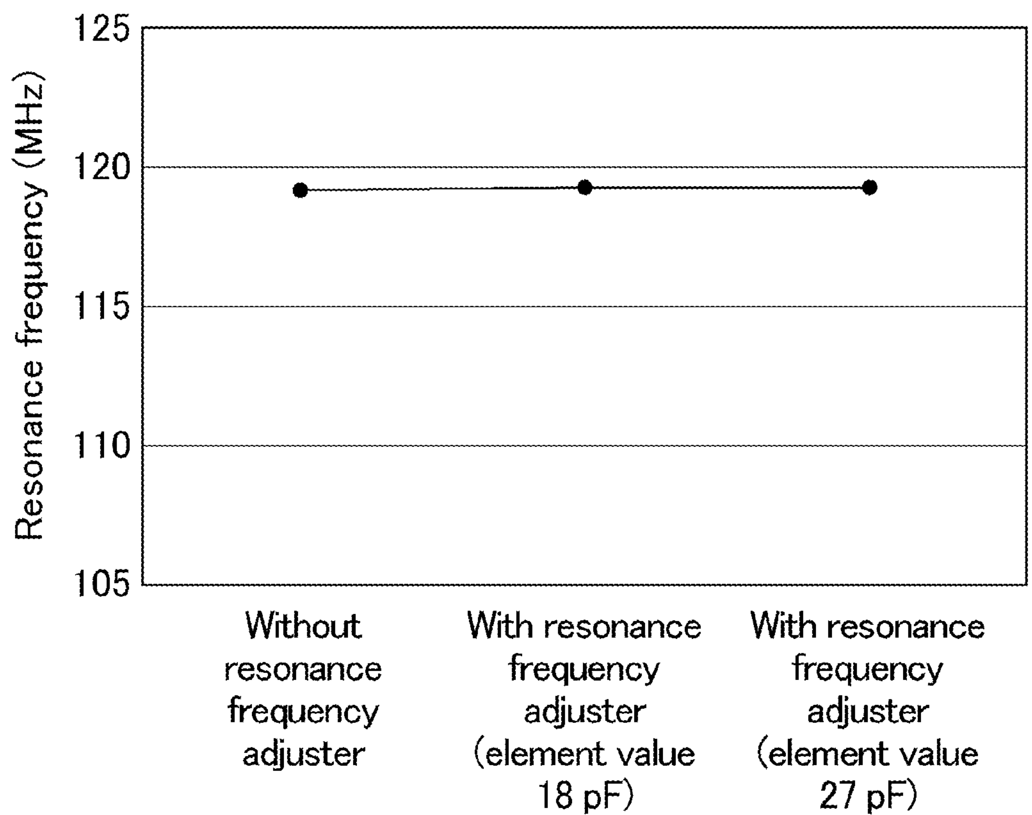
FIG. 11 shows a graph showing the change in resonance frequency according to the setting of the resonance frequency adjuster according to Example 2 of the present disclosure.

FIG. 11 shows the results of the resonance frequency measured under the same conditions as in Example 1, using the wireless power transmission system 22 provided as described above. As shown in FIG. 11, when the resonance frequency adjuster 5 was placed on the ZX plane, the resonance frequency was constant regardless of the presence of the resonance frequency adjuster 5 and the capacitance value of the element 17.

The results from Example 1 and Example 2 show that in the case of using the TE fundamental mode resonance, the resonance frequency adjuster 5 is preferably placed on a wall surface of the resonator, the wall surface being perpendicular to the axis where the mode order of the resonance mode is zero.

Example 3

Figure 12A:
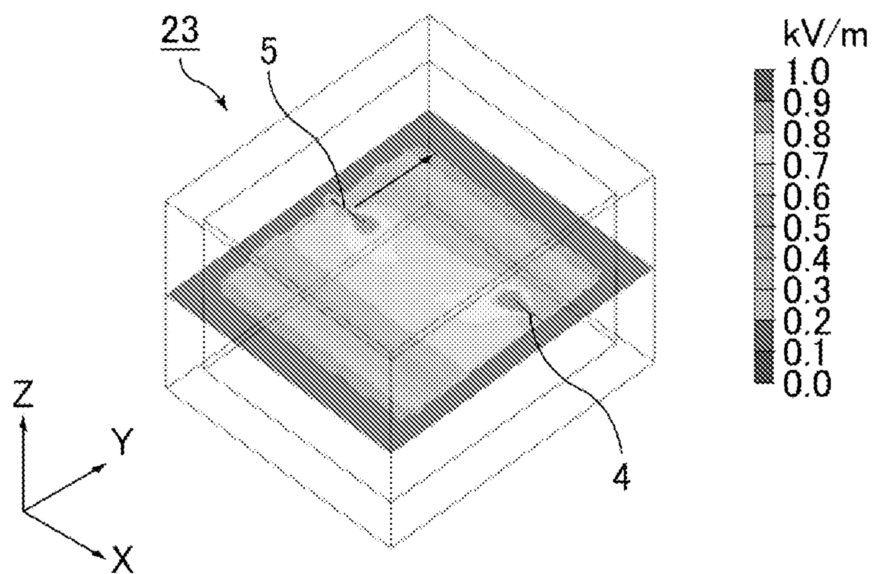
FIG. 12A shows schematic electric field strength distribution in a wireless power transmission system according to Example 3 of the present disclosure.
Figure 12B:
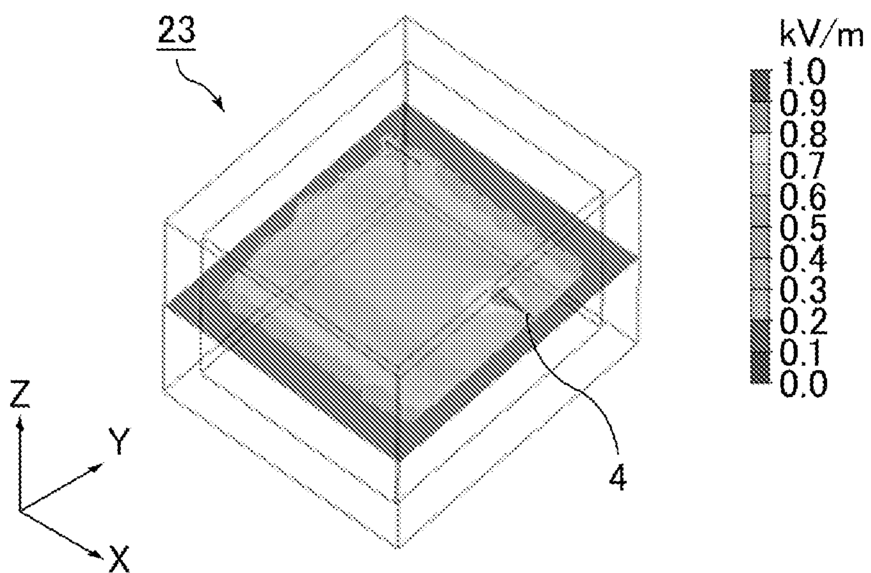
FIG. 12B shows schematic electric field strength distribution in the wireless power transmission system before placing the resonance frequency adjuster.

FIG. 12A shows schematic electric field strength distribution in a wireless power transmission system 23 according to Example 3 of the present disclosure. FIG. 12B shows schematic electric field strength distribution in the wireless power transmission system 23 before placing the resonance frequency adjuster 5. The resonator used in the wireless power transmission system 23 has a cuboidal shape having a length in the X-axis direction of 500 mm, a length in the Y-axis direction of 600 mm, and a length in the Z-axis direction of 400 mm. The resonance frequency adjuster 5 is placed on a YZ plane, and the power transmission unit 4 is placed on another YZ plane facing the resonance frequency adjuster 5.

The resonance frequency was measured when the resonance frequency adjuster 5 was moved in the Y-axis direction in the YZ plane facing the power transmission unit 4, with a position with the maximum relative electric field strength taken as 0.

Figure 13:
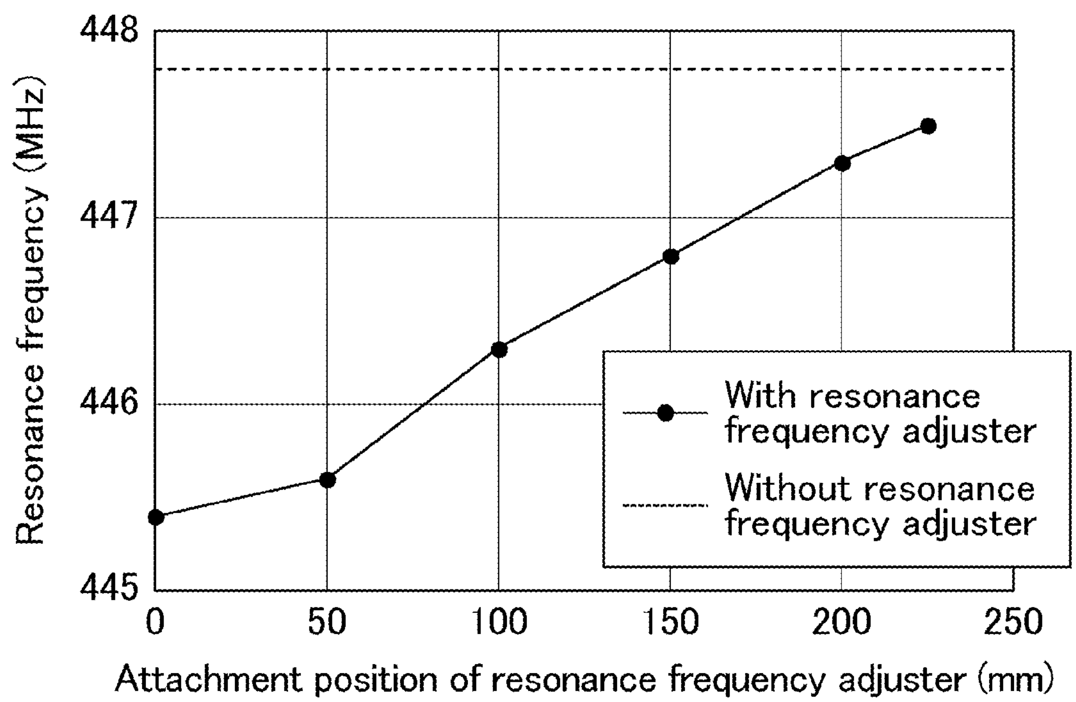
FIG. 13 shows a graph showing the relationship of resonance frequency versus attachment position of the resonance frequency adjuster in the wireless power transmission system.

FIG. 13 shows the relationship of resonance frequency versus attachment position of the resonance frequency adjuster 5 in the wireless power transmission system 23. In FIG. 13, the resonance frequency when the resonance frequency adjuster 5 was not attached is represented by a dashed line. FIG. 13 shows that the resonance frequency can be shifted to a low frequency when the resonance frequency adjuster 5 was attached, regardless of the position of the resonance frequency adjuster 5, compared to when the resonance frequency adjuster 5 was not attached.

Figure 14:
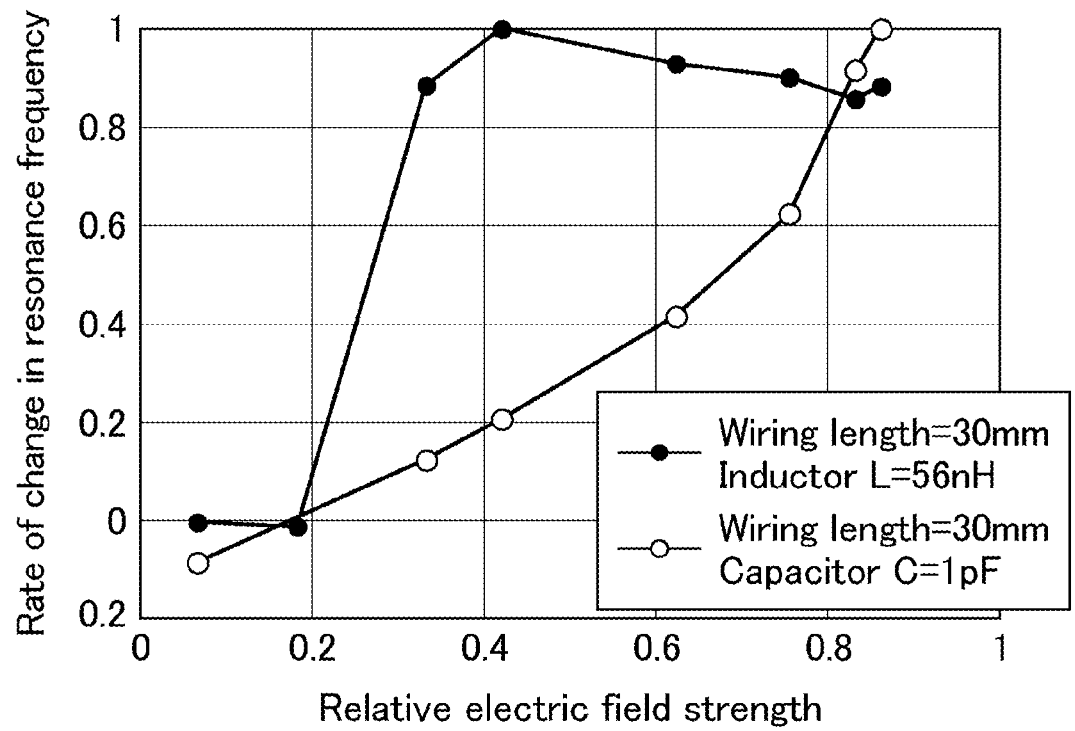
FIG. 14 shows a graph showing the rate of change in resonance frequency versus relative electric field strength at a position where an open end of a conductive protrusion is arranged in the wireless power transmission system.

FIG. 14 shows the rate of change in resonance frequency versus relative electric field strength at a position where the open end of the conductive protrusion 15 is arranged in the wireless power transmission system 23. The rate of change in resonance frequency is the rate of change in resonance frequency normalized when the resonance frequency adjuster 5 was attached, based on the resonance frequency when the resonance frequency adjuster 5 was not attached. The rate of change in resonance frequency is 0 when the resonance frequency is the same between when the resonance frequency adjuster 5 is attached and when the resonance frequency adjuster 5 is not attached. As shown in FIG. 14, even in the case where an inductor or a capacitor is attached as the element 17, the resonance frequency changes when the open end of the conductive protrusion 15 is arranged at a position where the relative electric field strength is 0.2 or more.

Example 4

Figure 15:
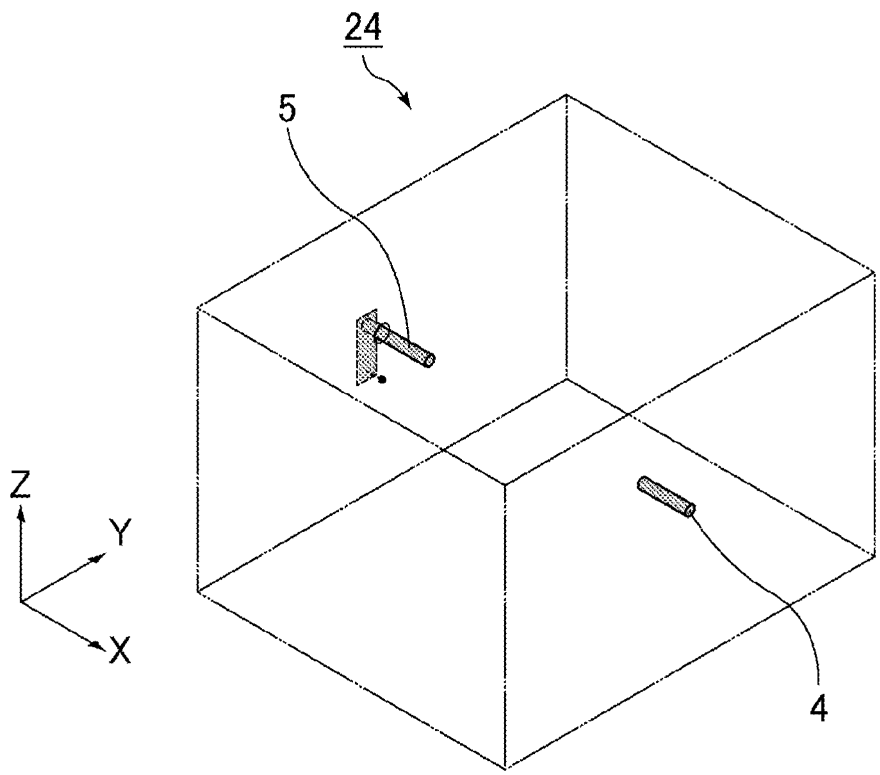
FIG. 15 shows a schematic view of a wireless power transmission system according to Example 4 of the present disclosure.

FIG. 15 shows a schematic view of a wireless power transmission system 24 according to Example 4 of the present disclosure. The resonator used in the wireless power transmission system 24 has a cuboidal shape having a length in the X-axis direction of 500 mm, a length in the Y-axis direction of 600 mm, and a length in the Z-axis direction of 400 mm. The resonance frequency adjuster 5 is placed on a YZ plane, and the power transmission unit 4 is placed on another YZ plane facing the resonance frequency adjuster 5.

Figure 16:
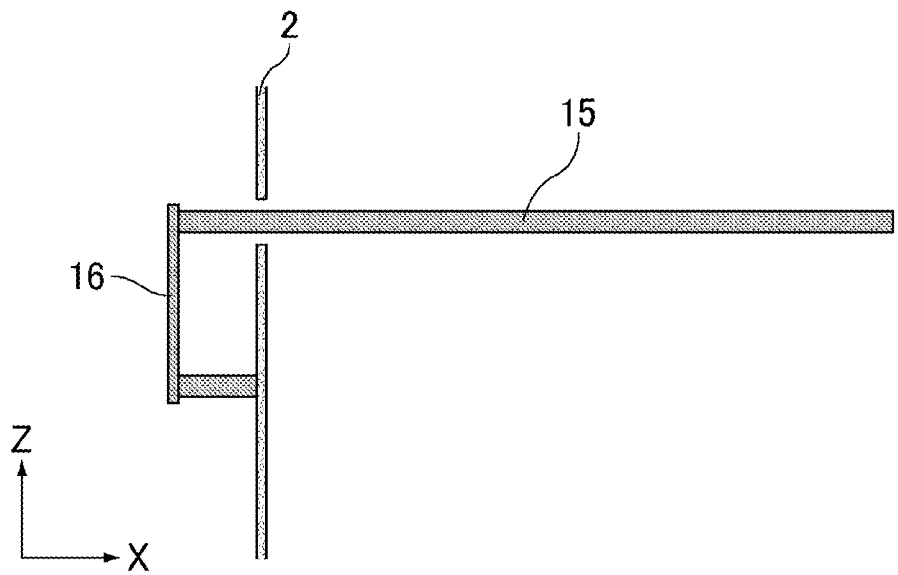
FIG. 16 shows a schematic view of the resonance frequency adjuster according to Example 4 of the present disclosure.

FIG. 16 shows a schematic view of the resonance frequency adjuster 5 according to Example 4 of the present disclosure. The conductive protrusion 15 has a total length of 90 mm and sticks out 80 mm from the electromagnetic wave shielding member 2 toward the inside. The resonance frequency was measured while changing the length of the transmission line 16. The line length of the resonance frequency adjuster 5 was changed to 110 mm, 140 mm, and 170 mm by changing the length of the transmission line 16 to 10 mm, 40 mm, and 70 mm, respectively.

Figure 17:
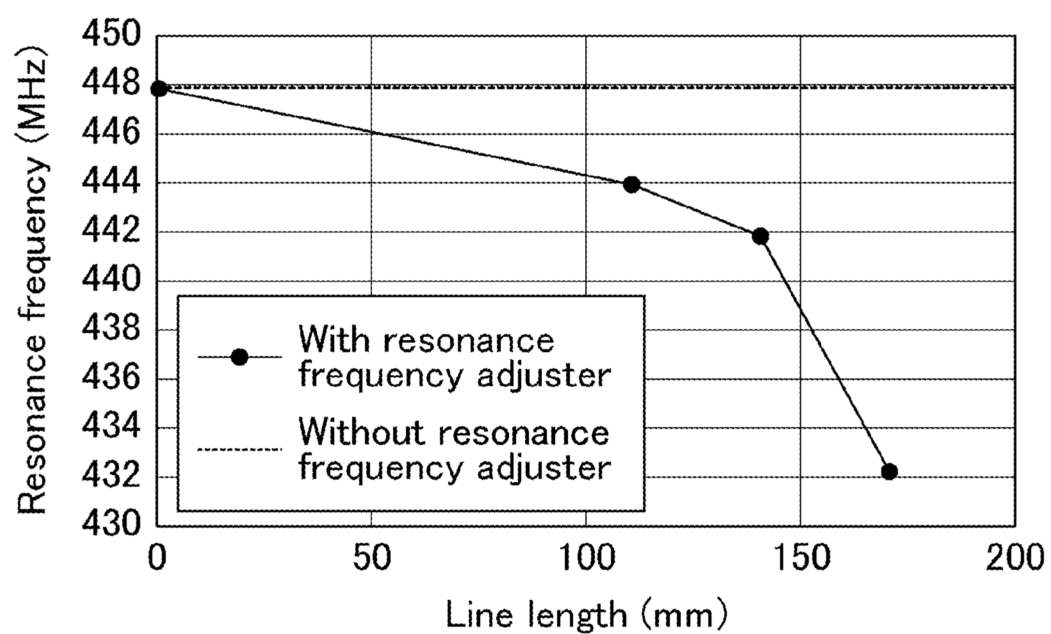
FIG. 17 shows a graph showing the relationship of resonance frequency versus line length of the resonance frequency adjuster in the wireless power transmission system.

FIG. 17 shows the relationship of resonance frequency versus line length of the resonance frequency adjuster 5 in the wireless power transmission system 24. In FIG. 17, the resonance frequency when the resonance frequency adjuster 5 was not attached is represented by a dashed line. FIG. 17 shows that the resonance frequency can be shifted to a low frequency when the resonance frequency adjuster 5 was attached, regardless of the position of the resonance frequency adjuster 5, compared to when the resonance frequency adjuster 5 was not attached. In particular, the longer the line length of the resonance frequency adjuster 5, the greater the amount of change in resonance frequency.

The line length of the resonance frequency adjuster 5 was fixed to 110 mm, and the element 17 was attached to the transmission line 16. In this state, the resonance frequency was measured. The element 17 was a capacitor or an inductor. The capacitance value (pF) or inductance value (nH) serving as an element parameter was changed.

Figure 18:
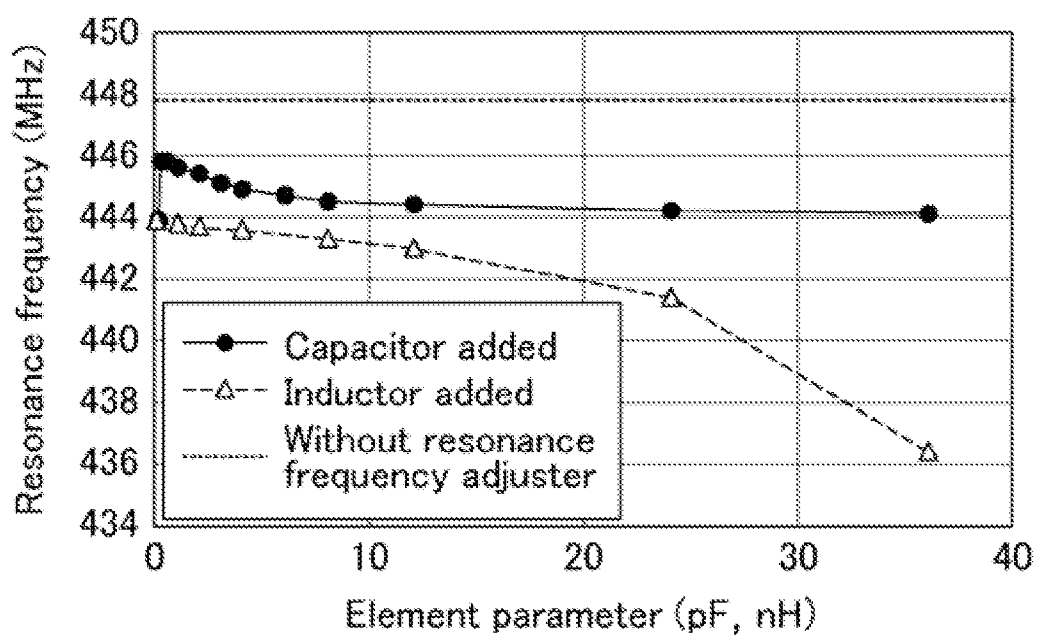
FIG. 18 shows a graph showing the relationship of resonance frequency versus element parameter in the wireless power transmission system.

FIG. 18 shows the relationship of resonance frequency versus element parameter in the wireless power transmission system 24. In FIG. 18, the resonance frequency when the resonance frequency adjuster 5 was not attached is represented by a dashed line. As shown in FIG. 18, the resonance frequency can be controlled by adjusting the capacitance value or the inductance value of the element 17.

What is claimed is:

1. A wireless power transmission system comprising:

a structure entirely surrounded by an electromagnetic wave shielding member having appropriate electrical conductivity and appropriate frequency selectivity;

at least one power receiving unit;

at least one power transmission unit; and at least one resonance frequency adjuster, wherein the resonance frequency adjuster includes:

at least one conductive protrusion having an open end; and a transmission line connected to another end of the conductive protrusion at one end of the transmission line, wherein the open end of the conductive protrusion is inside the structure, the transmission line is electrically connected to the electromagnetic wave shielding member defining a wall surface of the structure at another end not connected to the conductive protrusion, the power transmission unit includes a power transmitter, a matching circuit, and a power supply, the matching circuit is configured to adjust to match an impedance between the power transmission unit and the structure at a pre-set transmission frequency, and the wireless power transmission system is configured to use a constant transmission frequency.

2. The wireless power transmission system according to claim 1, wherein the another end of the conductive protrusion and the transmission line are inside the structure.

3. The wireless power transmission system according to claim 2, wherein an inductor or a capacitor is attached to the transmission line.

4. The wireless power transmission system according to claim 2, wherein a variable inductor or a variable capacitor is attached to the transmission line.

5. The wireless power transmission system according to claim 2, wherein the open end of the conductive protrusion is at a position where a relative electric field strength is from 0.2 to 1, assuming that a maximum electric field strength in a space away from the power transmission unit by $\lambda/20$ or more within a space entirely surrounded by the electromagnetic wave shielding member is defined as 1, where $\lambda$ is a wavelength of electromagnetic waves emitted from the power transmission unit.

6. The wireless power transmission system according to claim 2, wherein the resonance frequency adjuster is on a wall surface of the structure, the wall surface being perpendicular to an azimuth where an order of a resonance mode is zero when the resonance mode is a TE(0np) mode and n and p are integers.

7. The wireless power transmission system according to claim 1, wherein the another end of the conductive protrusion and the transmission line are outside the structure.

8. The wireless power transmission system according to claim 7, wherein an inductor or a capacitor is attached to the transmission line.

9. The wireless power transmission system according to claim 7, wherein a variable inductor or a variable capacitor is attached to the transmission line.

10. The wireless power transmission system according to claim 7, wherein the open end of the conductive protrusion is at a position where a relative electric field strength is from 0.2 to 1, assuming that a maximum electric field strength in a space away from the power transmission unit by $\lambda/20$ or more within a space entirely surrounded by the electromagnetic wave shielding member is defined as 1, where $\lambda$ is a wavelength of electromagnetic waves emitted from the power transmission unit.

11. The wireless power transmission system according to claim 7, wherein the resonance frequency adjuster is on a wall surface of the structure, the wall surface being perpendicular to an azimuth where an order of a resonance mode is zero when the resonance mode is a TE(0np) mode and n and p are integers.

12. The wireless power transmission system according to claim 1, wherein an inductor or a capacitor is attached to the transmission line.

13. The wireless power transmission system according to claim 12, wherein the open end of the conductive protrusion is at a position where a relative electric field strength is from 0.2 to 1, assuming that a maximum electric field strength in a space away from the power transmission unit by λ/20 or more within a space entirely surrounded by the electromagnetic wave shielding member is defined as 1, where λ is a wavelength of electromagnetic waves emitted from the power transmission unit.

14. The wireless power transmission system according to claim 1, wherein a variable inductor or a variable capacitor is attached to the transmission line.

15. The wireless power transmission system according to claim 1, wherein the open end of the conductive protrusion is at a position where a relative electric field strength is from 0.2 to 1, assuming that a maximum electric field strength in a space away from the power transmission unit by λ/20 or more within a space entirely surrounded by the electromagnetic wave shielding member is defined as 1, where λ is a wavelength of electromagnetic waves emitted from the power transmission unit.

16. The wireless power transmission system according to claim 15, wherein the open end of the conductive protrusion is arranged at a position where the relative electric field strength is from 0.33 to 1.

17. The wireless power transmission system according to claim 1, wherein the resonance frequency adjuster is on a wall surface of the structure, the wall surface being perpendicular to an azimuth where an order of a resonance mode is zero when the resonance mode is a TE(0np) mode and n and p are integers.

18. A resonance frequency adjuster for a wireless power transmission system, the resonance frequency adjuster comprising:

at least one conductive protrusion having an open end; and a transmission line connected to another end of the conductive protrusion at one end of the transmission line, wherein the wireless power transmission system includes:

a structure entirely surrounded by an electromagnetic wave shielding member having appropriate electrical conductivity and appropriate frequency selectivity;

at least one power receiving unit; and at least one power transmission unit, wherein the open end of the conductive protrusion is inside the structure, the transmission line is configured to electrically connect to the electromagnetic wave shielding member defining a wall surface of the structure at another end not connected to the conductive protrusion, the power transmission unit includes a power transmitter, a matching circuit, and a power supply, the matching circuit is configured to adjust to match an impedance between the power transmission unit and the structure at a pre-set transmission frequency, and the wireless power transmission system is configured to use a constant transmission frequency.

19. The resonance frequency adjuster according to claim 18, wherein an inductor or a capacitor is attached to the transmission line.

20. The resonance frequency adjuster according to claim 18, wherein a variable inductor or a variable capacitor is attached to the transmission line.

* * * * *